Oct. 14, 1952     H. N. WYLIE     2,613,385
WINDSHIELD WIPER HAVING A CURVED SPRING WIPER ARM
Filed July 9, 1947
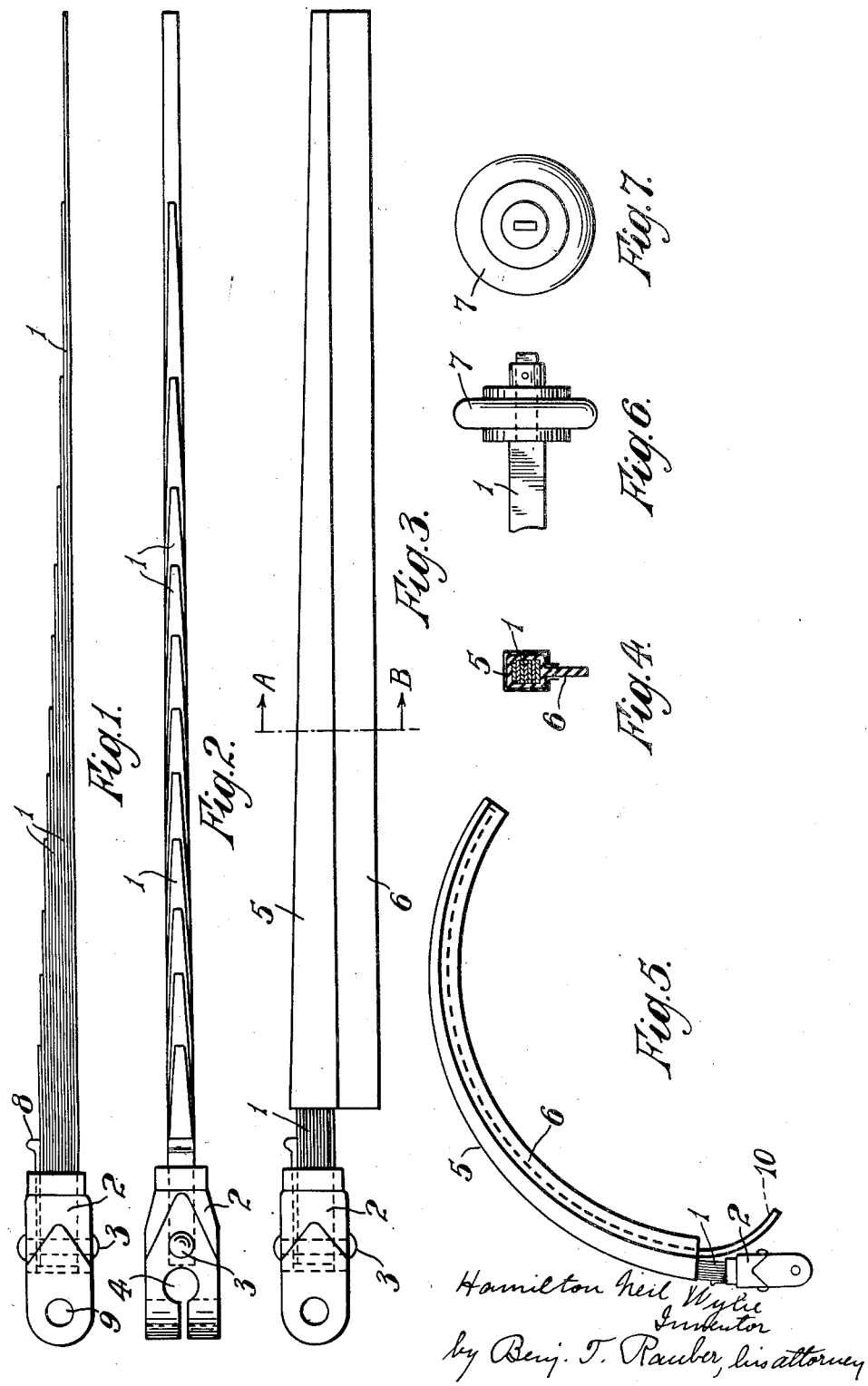

Patented Oct. 14, 1952

2,613,385

UNITED STATES PATENT OFFICE 2,613,385

WINDSHIELD WIPER HAVING A CURVED SPRING WIPER ARM

Hamilton Neil Wylie, Richmond, England, assignor to Dunlop Rim & Wheel Co. Ltd., London, England, a British corporation Application July 9, 1947, Serial No. 759,815
In Great Britain July 5, 1945

Section 1, Public Law 690, August 8, 1946
Patent expires July 5, 1965

6 Claims. (Cl. 15—250.3)

My invention relates to windshield wipers of the type which comprise a pivoted or otherwise movable curved spring arm carrying a rubber or other squeegee which actually contacts the surface to be wiped.

Such windshield wipers are commonly employed in connection with flat windshields and the chief object of the present invention is to provide an improved screen wiper which will be capable of wiping screens having a curved surface, particularly curved screens such as are commonly used on aircraft.

A further object of the invention is to connect the arm carrying the squeegee directly to the operating shaft and thus dispense with the intermediate radius member which is usually connected to the centre of the member carrying the squeegee.

A still further object of the invention is to provide an arm and squeegee which can be saturated with de-icing fluid.

A windshield wiper of the type set forth and in accordance with the present invention is provided with a wiping assembly which comprises an arm carrying a squeegee of relatively soft material, the assembly being flexible and initially curved throughout its length and of a stiffness which increases from the tip to the root.

It is preferred that the arm shall comprise a series of superimposed laminations of springy steel or similar material which are of progressively increasing length, the arm being of progressively increasing thickness and stiffness from its free end to its point of attachment with the central shaft which is operated by the actuating motor, the squeegee being in the form of a rubber or rubber and fabric member bonded or otherwise secured to the arm throughout its length.

The fabric may be incorporated simply to reinforce the casing and/or blade of the squeegee or may comprise an outer covering of absorbent material capable of soaking up de-icing fluid supplied to it preferably near the base of the assembly by a wick or tube, or by a spray.

In order that the invention may be clearly understood and readily carried into effect the invention is hereinafter described with reference to the accompanying drawings, in which:

Figure 1 is a side elevation of a windshield wiper arm in accordance with the present invention the component being shown in a flat straight condition;

Figure 2 is a plan of the same;

Figure 3 is a side elevation of such an arm carrying a squeegee in accordance with the invention;

Figure 4 is a transverse section on the line A—B in Figure 3 but showing a fabric envelope;

Figure 5 is a side elevation on a reduced scale showing the initial curved form of the arm and squeegee and showing a liquid supply tube;

Figures 6 and 7 are respectively side and end elevations illustrating a modification.

Referring now to the accompanying drawings which illustrate a preferred embodiment of the invention, the windshield wiper arm is built up from a series of laminations 1 of springy steel or other suitable resilient material, the laminations nearer the windshield being progressively longer from the supported end to the free end as is clearly shown in Figures 1 and 2. The laminations at the thick end of the arm are mounted in a broached hole in a pivoted base 2 and are secured by a wedge 8 and locked in position therein by means of a rivet or other suitable securing member 3, the base being bored as at 4 for mounting in position on a shaft to which it is clamped by a bolt in hole 9. The shaft is capable of angular movement to move the arm over the surface of the windshield which is to be wiped.

The arm is of the initial curved formation shown in Figure 5, being of arcuate shape throughout its length. The advantage of such an arrangement is that each lamination being shorter than the next the bending resistance of the laminated arm increases at a predetermined rate from the free end to a maximum value at the base. It is preferred that the various laminations shall be of the tapered formation clearly shown in Figure 2. The curved formation of the arm enables the squeegee to maintain a substantially uniform pressure throughout its length on the windshield irrespective of the latter's degree of curvature.

The squeegee is preferably in the form of a rubber moulding and comprises a casing 5 of rectangular formation having an integral projecting squeegee portion 6 adapted to make edge contact with the surface of the windshield to be wiped, the casing 5 surrounding the arm and being, if necessary, bonded or otherwise secured in position thereon.

In Figure 4 an envelope of absorbent fabric is shown surrounding the arm and part of the blade and in Figure 5 a rubber tube 10 is indicated. This tube may convey a metered supply of de-icing fluid to the absorbent envelope in known manner.

If desired, the free extremity of the arm may be fitted with a wheel or roller 7, such as is indicated in Figures 6 and 7, for the purpose of relieving the pressure exerted by the tip of the arm on the surface of the windshield.

Although in the construction illustrated the arm is intended to have an angular movement relative to the windshield, this movement may be a reciprocating one and it will be appreciated that the inherent resiliency of the arm will permit the arm to change its shape throughout its length to suit the curvature of any part of the windshield with which the squeegee is actually in contact, the windshield wiper therefore being capable of wiping windshields which are flat or of curved formation in one or two planes.

It is preferred that the arm and squeegee shall have an initial curvature of quite small radius in comparison with the radius of curvature of the windshield to which it is fitted so as to ensure of an adequate pressure being exerted on the windshield even though the radius of curvature of the windshield may differ in different directions, the arm being so designed that it has sufficient inherent resiliency to maintain an adequate wiping contact between the squeegee and the windshield irrespective of the windshield's radius of curvature.

Having described my invention, what I claim is:

1. A windshield wiper which comprises a pivoted base, a spring wiper arm mounted on said base, curved in a plane radial to the pivotal axis of said base and of progressively decreasing stiffness at increasing distance from said base, and a squeegee of relatively soft material mounted directly on said arm lengthwise thereof and on the inner side of its curvature.

2. A windshield wiper which comprises a pivoted base, a spring wiper arm mounted on said base, curved in a plane radial to the pivotal axis of said base and of progressively decreasing stiffness at increasing distance from said base, and a squeegee of relatively soft material mounted directly on said arm lengthwise thereof and on the inner side of its curvature, said arm comprising a number of superposed laminations of spring material extending from said base, the laminations being of decreasing length from the inner side of said arm to the outer side thereof.

3. A windshield wiper according to claim 1, wherein the wiping assembly comprises a casing of relatively soft material surrounding the arm and having an integral squeegee portion projecting therefrom on the concave side of the arm.

4. A windshield wiper according to claim 2, wherein the wiping assembly comprises a casing of relatively soft material surrounding the arm and having an integral squeegee portion projecting therefrom on the concave side of the arm.

5. A windshield wiper according to claim 1 wherein the free end of the arm carries a wheel adapted to rotate in contact with the surface of the windshield during movement of the wiper arm between its extreme angular positions.

6. A windshield wiper as claimed in claim 1 in which absorbent material adapted to be saturated with de-icing fluid extends along the squeegee.

HAMILTON NEIL WYLIE.

REFERENCES CITED

The following references are of record in the file of this patent:

UNITED STATES PATENTS

| Number | Name | Date |
|---|---|---|
| 1,246,829 | McWhirter | Nov. 13, 1917 |
| 1,326,145 | Stadeker | Dec. 23, 1919 |
| 1,498,155 | Dorr | June 17, 1924 |
| 1,675,816 | Mokma | July 3, 1928 |
| 1,684,907 | Blake | Sept. 18, 1928 |
| 2,291,435 | Anderson | July 28, 1942 |

FOREIGN PATENTS

| Number | Country | Date |
|---|---|---|
| 427,383 | Great Britain | Apr. 23, 1935 |
| 820,156 | France | July 26, 1937 |